United States Patent
Chu et al.

(10) Patent No.: US 7,973,265 B2
(45) Date of Patent: Jul. 5, 2011

(54) COUPLED OPTICAL WAVEGUIDE RESONATORS WITH HEATERS FOR THERMO-OPTIC CONTROL OF WAVELENGTH AND COMPOUND FILTER SHAPE

(75) Inventors: Sai Chu, Columbia, MD (US); Frederick G. Johnson, Ellicott City, MD (US); Oliver King, Annapolis, MD (US); Marcus Schuetz, Severn, MD (US); Brent Little, Columbia, MD (US)

(73) Assignee: Infinera Corporation, Sunnyvale, CA (US)

( * ) Notice: Subject to any disclaimer, the term of this patent is extended or adjusted under 35 U.S.C. 154(b) by 121 days.

(21) Appl. No.: 12/551,500

(22) Filed: Aug. 31, 2009

(65) Prior Publication Data

US 2009/0314763 A1 Dec. 24, 2009

Related U.S. Application Data

(62) Division of application No. 11/800,568, filed on May 7, 2007, now Pat. No. 7,583,879, which is a division of application No. 11/208,338, filed on Aug. 19, 2005, now Pat. No. 7,231,113.

(51) Int. Cl.
*G02B 6/26* (2006.01)
*G02B 6/35* (2006.01)
*G02B 6/42* (2006.01)
*H05B 3/26* (2006.01)
*H05B 1/02* (2006.01)

(52) U.S. Cl. ........ 219/476; 219/201; 219/209; 219/477; 219/486; 219/494; 385/8; 385/16; 385/30

(58) Field of Classification Search .................. None
See application file for complete search history.

(56) References Cited

U.S. PATENT DOCUMENTS

| | | | | |
|---|---|---|---|---|
| 4,517,427 A * | 5/1985 | Coy | ............................ | 219/772 |
| 5,041,800 A * | 8/1991 | Long et al. | ...................... | 331/69 |
| 6,363,773 B1 * | 4/2002 | Bowers | ....................... | 73/24.06 |
| 6,636,668 B1 * | 10/2003 | Al-hemyari et al. | ........... | 385/40 |
| 7,058,258 B2 * | 6/2006 | Yamazaki | ....................... | 385/27 |
| 7,440,643 B2 * | 10/2008 | Yamazaki | ........................ | 385/5 |
| 7,539,369 B2 * | 5/2009 | Yamazaki | ........................ | 385/14 |
| 7,585,117 B2 * | 9/2009 | Kaneko et al. | ................... | 385/88 |
| 2003/0152313 A1 * | 8/2003 | Tapalian et al. | ................. | 385/16 |
| 2005/0013537 A1 * | 1/2005 | Yamazaki | ....................... | 385/27 |
| 2006/0072875 A1 * | 4/2006 | Bhagavatula et al. | .......... | 385/30 |
| 2007/0230856 A1 * | 10/2007 | Yamazaki | ........................ | 385/5 |
| 2007/0258677 A1 * | 11/2007 | Chigrinov et al. | ............. | 385/15 |

* cited by examiner

*Primary Examiner* — Joseph M Pelham
(74) *Attorney, Agent, or Firm* — David L. Soitz; Ross M. Carothers

(57) ABSTRACT

An integrated optical device is disclosed comprising a substrate, optical waveguide, and compound optical resonator having a temperature sensor, at least two coupled optical resonators, and a heater localized to each optical resonator. An optical input signal is coupled to one of the resonators making up the compound resonator to form an optical output signal. The center wavelength and shape of the output signal is optimized with a feedback loop using the temperature sensor to control the power dissipated in at least one of the localized heaters. The power dissipated in the remaining resonator heaters is set according to a predetermined function having as an input variable the power dissipated in the resonant heater under control of the said feedback loop.

7 Claims, 10 Drawing Sheets

COUPLED OPTICAL WAVEGUIDE RESONATORS WITH HEATERS FOR THERMO-OPTIC CONTROL OF WAVELENGTH AND COMPOUND FILTER SHAPE

CROSS-REFERENCE TO RELATED APPLICATIONS

This patent application is a divisional patent application of U.S. Ser. No. 11/800,568 filed on May 7, 2007, now U.S. Pat. No. 7,583,879 which is a divisional patent application of U.S. Ser. No. 11/208,338 filed on Aug. 19, 2005, now U.S. Pat. No. 7,231,113 the entire content of which is hereby incorporated herein by reference.

BACKGROUND OF THE INVENTION

1. Field of the Invention

This invention pertains to integrated optical circuits having optical waveguides wherein a portion of the optical waveguides' refractive index is adjusted thermo-optically. More particularly, this invention pertains to thermo-optic control of the transfer function of a compound optical resonator by use of individual heaters localized to each resonator waveguide element and a local temperature sensor.

2. Description of the Related Art

The field of integrated optics has expanded tremendously over the past decade, and integrated optical device solutions are now being proposed for applications in a variety of fields including: telecommunications, data communications, high performance computing, biological and chemical sensing, and RF networks. Long haul, metropolitan, and local networks, as well as fiber-to-the-home applications, predominately rely on optical communications for data transmission. Wavelength division multiplexing (WDM) technologies have enabled a dramatic increase in the communications bandwidth of optical fiber. At channel spacings of 50 GHz, hundreds of signal channels are possible within the S-, C-, and L-bands of optical fiber covering the wavelength region from 1460 to 1625 nm. Some fiber-to-the-home applications utilize the O-band (1260-1360 nm) as well. More recently, optical data transmission has been investigated for computing systems to enable high bandwidth communications between processors, memory, and I/O. Improved RF system designs, such as phased array radars, with integrated optical devices in place of conventional microwave components have been shown to have higher potential bandwidths and target resolution. Lastly, spectroscopic applications of integrated optical devices in the ultra-violet and visible wavelength regions are being considered for biological and chemical sensors.

Integrated optics is the technology of integrating various optical devices and components to transport, focus, multiplex, demultiplex, split, combine, polarize, isolate, couple, switch, filter, modulate (phase or amplitude), detect, and generate light. Integrated optical devices combine several of these functions on a common chip or substrate. Examples include commercial planar lightwave circuits (PLCs), such as those that have been installed in WDM communication systems to multiplex and demultiplex optical channels on a fiber. More complex multiple layer PLCs have also been designed that incorporate waveguides and device circuitry on multiple planar layers interconnected using optical via technology. Newer integrated devices such as photonic integrated circuits (PICs) are now being developed by companies such as Infinera (Sunnyvale, Calif.) for high performance network operating systems and optical routing and switching applications.

Optical waveguides are the key building block of integrated optical devices. Optical waveguides are light conduits consisting of a slab, strip, or cylinder of dielectric core material surrounded by dielectric cladding materials of lower refractive index. FIG. 1 depicts an example planar optical waveguide 40, known in the art as a ridge waveguide, formed on a substrate or wafer 42 by the formation of a lower optical cladding 44; chemical vapor deposition, lithographic patterning, and etching of an optical core element 46; and lastly by surrounding the optical core element with an upper optical cladding layer 48. Other types of optical waveguide designs include rib, trench, filled trench, and strip-loaded waveguides. Typical lateral and vertical dimensions of the core elements in glass-based optical planar lightwave circuit waveguides lie between about 0.5 and 5 microns.

An optical waveguide or combination of optical waveguides can be assembled to form devices such as: optical resonators, arrayed waveguide gratings, couplers, splitters, polarization splitters/combiners, polarization rotators, mach-zehnder interferometers, multimode interference waveguides, gratings, mode transformers, delay lines, and optical vias. Devices such as these may then be combined or integrated on an optical chip to create an integrated optical device or planar lightwave circuit that performs one or more optical functions such as: multiplexing/demultiplexing, optical add/drop, variable attenuation, switching, splitting/combining, filtering, spectral analysis, variable optical delay, clock distribution, amplitude/phase modulation, polarization rotation, comb generation, and dispersion compensation.

Integrated optical devices and planar lightwave circuits can be fabricated on a variety of substrates or wafers. Some of the more common materials used are silicon, silicon wafers having silicon-oxide ($SiO_2$) or thermal oxide layer coatings, and indium-phosphide (InP). Other materials considered for substrate or wafer applications include germanium, silica, fused quartz, sapphire, alumina, glass, gallium-arsenide, silicon-carbide, lithium-niobate, silicon-on-insulator, germanium-on-insulator, and silicon-germanium. Integrated optical devices or planar lightwave circuits may also be fabricated on or placed over preformed devices or circuits such as: one or more electrical devices (e.g. transistors), optical devices (e.g. mode transformers), microelectromechanical (MEMS) devices (e.g. mirrors), or optoelectronic devices (e.g. detectors, amplifiers, modulators, light emitting diodes, or lasers).

The material system most commonly used for planar optical waveguide devices is germanium doped silicon oxide $SiO_2$:Ge. The waveguide consists of a $SiO_2$:Ge optical core element, having a refractive index, that is surrounded by lower and upper cladding layers having smaller refractive indices. Typical cladding layer materials include air, polymer, silica ($SiO_2$) and doped silicas such as phosphosilicate glass (PSG), borosilicate glass (BSG), borophosphosilicate glass (BPSG), and flourine doped silica (SiOF). The ability to shrink the dimensions of an optical circuit is generally limited by the refractive index contrast of the optical waveguides from which it is formed, where the refractive index contrast is defined as the ratio $(n_{core}-n_{clad})/n_{clad}$. The smallest possible size of an optical device is constrained by the minimum allowable radius of curvature of its optical waveguides before incurring significant optical propagation loss of 0.5 dB/cm or more. Lower optical losses of less than 0.2 dB/cm are preferred. The higher the index contrast, the easier it is for waveguides to be routed on a chip using tight turns and small bend radii of curvature. For $SiO_2$:Ge based optical waveguides, the maximum index contrast is limited to about 0.03 (3%), resulting in a minimum radius of curvature of at least 500 μm.

Silicon-oxynitride (SiON) is another doped silica that has been used for the fabrication of planar lightwave circuits (see, e.g., G. L. Bona, R. Germann, and B. J. Offrein, "SiON high refractive index waveguide and planar lightwave circuits," IBM J. Res. & Dev. 47 (2/3), 239 (2003) incorporated herein by reference). SiON materials can be formed that are substantially transparent with an absorption loss of less than about 0.5 dB/cm in the wavelength region from 700 nm to 1650 nm. For the wavelength range from 1460 nm to 1625 nm, propagation losses of less than 0.2 dB/cm have been demonstrated. Low loss optical waveguides have been demonstrated having SiON core elements and $SiO_2$ cladding layers with significantly higher refractive index contrasts than is possible with $SiO_2$:Ge (see, e.g., U.S. Pat. No. 6,614,977). Optical waveguides with refractive index contrasts of about 0.17 (17%) can be fabricated from SiON core elements, having a refractive index of 1.7, and $SiO_2$ cladding layers, having a refractive index of about 1.45 measured at a wavelength of 1550 nm. At this high index contrast, waveguides can be designed with radii of curvature as small as about 35 μm. For the SiON core elements, the highest potential refractive index value is 2, corresponding to silicon-nitride ($Si_3N_4$). Other materials being looked at for high index contrast waveguide applications include silicon, germanium, indium-phosphide, aluminum-oxide, silicon-oxycarbide (SiOC), and polymers.

A common optical element in most optical integrated circuits is a thermo-optic device, wherein a portion of the optical core waveguiding elements within the device is locally heated with respect to rest of the device by use of a local resistive heating element. Local heating of a waveguide shifts the phase of an optical signal within the waveguide by way of the thermo-optic effect on refractive index and is usually denoted by the change of refractive index with change in temperature or dn/dT. In addition, there can be a secondary contribution to the thermally induced phase shift from thermal expansion of waveguide dimensions. For example, an optical device such as a ring resonator has a set of resonant wavelengths given approximately by:

$$\lambda_i = \frac{2\pi r n}{i}$$

where r is the ring radius, n is the optical waveguide effective index, and i is an integer. The resonant wavelengths of the ring may be changed by locally raising or lowering the temperature of the ring waveguide, and the effective refractive index may be approximated by $$n = n_o + (dn/dT)\Delta T$$

where no is the effective index at the initial temperature $T_o$, dn/dT is the rate of change of refractive index with temperature at $T_o$, and $\Delta T$ is the net change in temperature $T-T_o$. For optical devices formed from $SiO_2$:Ge, the dn/dT is typically just under $1\times10^{-5}/°C$. For optical devices formed from chemical vapor deposited SiON-based optical waveguides, the dn/dT is typically about 1.1 to $1.4\times10^{-5}/°C$. depending on the composition. Applications of optical resonator thermo-optic devices requiring precise control of resonant frequency of better than ±1 GHz are not well suited to materials with high dn/dT magnitudes greater than about $5\times10^{-5}$. A large dn/dT in this case is not desirable as it will require very precise local temperature control on the order of 0.1° C. Low dn/dT magnitudes of less than about $1\times10^{-5}$, however, require somewhat more power as larger local temperature changes are needed to achieve a desired refractive index change, Δn.

Optical resonators are optical cavities supporting standing or traveling wave resonant optical modes. This invention considers an optical resonator to be any closed loop optical waveguide or disk supporting resonant optical modes. Examples of optical resonator waveguides 60 are depicted in FIG. 2 and include an optical waveguide core with a disk geometry 62, ring geometry 64, ellipse geometry 66, or race-track geometry 68. Optical resonator waveguides 60 having the ring geometry 64 are the most commonly studied resonator cavity for integrated optical devices with a set of resonant wavelengths determined by the radius and effective index of the cavity. Optical resonators can be used singly or in multiples to form a compound optical resonator. Higher order cascades of optically coupled resonators are depicted in FIG. 3 showing second 80, third 82, and fifth 84 order compound optical ring resonator cavities. The Lorentzian response of a single-ring, channel dropping filter can be improved upon to achieve a wider and flatter passband as well as larger out of band signal rejection by moving to higher order filters, that is compound resonators consisting of multiple optically coupled resonators. The theory of compound optical resonators is discussed by RB. Little et al. in "Microring resonator channel dropping filters," Journal of Lightwave Technology, Vol. 15, No. 6, pp 998-1005 (1997) and is incorporated herein by reference.

Compound optical resonators must be optically coupled to at least one optical waveguide to form a useful optical device. A compound optical resonator cavity coupled to a single optical waveguide, as shown by 90 in FIG. 4, can be used to modify the phase of an optical signal in an all-pass filter or a dispersion compensator device. A compound optical resonator cavity coupled to two optical waveguides, depicted by 92 in FIG. 4, can be used as a channel dropping filter in which an optical signal or set of optical signals resonant with the modes of the compound optical resonator are dropped from one optical waveguide and added to the other. In these examples, the optical waveguide or waveguides must be adjacent to one of the resonator waveguides of the compound optical resonator such that the optical modes are coupled. In FIG. 4, optical waveguides are shown that are positioned laterally adjacent 92, above 94, and below 96 optical resonators.

The transfer function of an optical system is the effect on an optical signal in the frequency domain. The transfer function, for example, of an optical filter device acting on an optical input signal determines both the shape and center wavelength (frequency) of the optical output. A filter composed of a single ring resonator will take an optically flat input signal and transform it into a set of Lorentzian shaped output signals centered at the resonant wavelengths of the resonator. Optical filters composed of multiple and identical coupled ring resonators produce an output signal having a flatter and broader passband as well as larger out of band signal rejection.

The output of a thermo-optic compound optical resonator device will generally remain at a fixed wavelength unless there is a change in temperature. The temperature may be changed globally using a heater or Peltier element such as a thermoelectric cooler (TEC) that is in thermal contact with the integrated optical device substrate. It is more desirable, however, to use a heater or set of individual heaters localized to each compound thermo-optic element in the integrated optical device to allow for independent control. Simple resistive heaters can be fabricated by the deposition and patterning of metal films (such as platinum, gold, aluminum, chrome, nickel, nichrome, or tungsten) or semiconductor materials such as polysilicon. Other possible heater designs include localized Peltier elements.

Some commercially available thermo-optic devices such as switch arrays and optical attenuators operate by the simple application of a predetermined fixed power to each thermo-optic element heater in order to achieve a calibrated optical state. More sophisticated devices, such as those incorporating compound resonators, require a method of control that utilizes a feedback control loop. One possible feedback method is to analyze the optical output signal itself, by monitoring the signal's center wavelength for example, and use this parameter to determine the appropriate heater power dissipation applied to the thermo-optic element in real time. This method becomes unwieldy for a complex integrated optical device and would involve multiple real time optical measurements for the elements within the device. A much simpler approach is to use as a feedback variable for each heater a measurement of the local temperature. The most simple device used for temperature measurement are thermistors or resistive temperature devices (RTDs) that have a resistance value that changes as a function of the local temperature. For example, a metal film resistor can be deposited around or over an optical resonator waveguide in order to monitor the local average temperature. Platinum is the most common metal used to fabricate metal film RTDs, but copper, nickel, and nickel-iron are also used. Thermistors are generally made from semiconducting metal-oxide ceramics. Other example temperature sensors include a temperature sensing diode or a thermocouple, which generates an electric potential between two dissimilar metals that is a function of temperature.

A control system is required to adjust, regulate, or control the power dissipation in a heater. Generally, a control system will monitor the feedback variable from a temperature sensor (e.g. the resistance value of an RTD) and change the power dissipated in the heater as needed to bring the feedback variable to a predetermined set value or setpoint. Example controllers include simple on/off, proportional, proportional bandwidth, and PiII type controllers. Examples of these controllers are commercially available from vendors such as Omega Engineering Inc., Stamford Conn. Integrated optical devices, however, generally integrate the control functions and electronic devices within a printed circuit board. The controllers can adjust the heater power dissipation through an analog change in voltage (current) applied to a heater or through a change in the duty cycle of a digital pulse train, or filtered digital pulse train, known as pulse width modulation (PWM). PWM controllers are commercially available as digital signal processor chips from companies such as Freescale Semiconductor Inc., Austin Tex. (e.g. DSP56F8XX series). Often these functions are integrated into a printed circuit board as well.

Prior art work has focused on methods of thermally tuning optical resonators composed of a single ring. In P. Heimala et al., "Thermally tunable integrated optical ring resonator with poly-si thermistor," Journal of Lightwave Technology, Vol. 14, No. 10, pp 2260-2267 (1996), incorporated herein by reference, the authors disclose a $Si_3N_4$ rib-waveguide-based ring resonator integrated with a local thermistor and polysilicon heater. In this paper, the resonant wavelength is adjusted using the feedback of a thermistor to regulate the power dissipated in a heater overlaying a ring waveguide. U.S. Pat. No. 6,636,668, incorporated herein by reference, also discloses a thermally tunable resonator device, each resonator comprising a heater and a temperature sensor. Compound resonators comprising multiple rings are discussed in U.S. Pat. No. 6,411,752, incorporated herein by reference, where the use of localized heaters placed above or below each ring is proposed as a method of tuning, however, there is no mention of feedback control methods.

Although it is relatively straightforward to control the resonant wavelength of a single ring resonator using a heater and a temperature sensor, compound optical resonators comprising at least two optically coupled resonators are more complex. One could simply devise a design incorporating one large area heater that covered all the optical resonators of the compound resonator. The resonant wavelength of the compound resonator could then be adjusted using feedback from a single temperature sensor to control the power sent to the one heater. There are two major limitations of this design. One, a large area heater will use significantly more power than an individual heater that is substantially of similar size and conformal in shape to the optical resonator waveguides. Two, it is difficult to devise a large area heater that produces a laterally uniform temperature profile across a set of coupled resonators and over a reasonably large temperature range of many tens of degrees Celsius. This type of heater will generally be hotter in the center and cooler near the edges resulting in an offset in resonant wavelength, or detuning, between optical resonators positioned nearer the center and nearer the edge of the heater. The result would be a deterioration in the compound filter shape from optimum.

An alternate method would be simply to use independent control for each resonator in the compound resonator as disclosed by Kuipers et. al in "Integrated optical signal handling device," International Publication No. WO 02/103448 A2. There are several major disadvantages with this method. First, each optical resonator within the integrated optical device would need its own heater and temperature sensor. This greatly increases the number of electrical connections required by the optical chip. In addition, a complete feedback loop is required for each individual heater with electronics and software dedicated to the monitoring of each temperature sensor over time. An integrated optical chip having four compound resonators each consisting of five rings would require twenty temperature sensors and feedback loops. Second, independent feedback control loops localized to each ring will be influenced by the control loop operating on adjacent optical resonators. The optical coupling requirement between resonators causes a portion of the outer surfaces of each resonator waveguide to be positioned within about a micron or less of each other. This separation is known as the coupling gap. The small separation means that there will be significant thermal crosstalk between the temperature sensor of one resonator and the heaters of adjacent resonators that results in control loop instability.

BRIEF DESCRIPTION OF THE DRAWINGS

So that the features and advantages of the present invention can be understood in detail, a particular description of the invention may be had by reference to the embodiments thereof that are illustrated in the appended drawings. It is to be noted, however, that the appended drawings illustrate only typical embodiments of this invention and are therefore not to be considered limiting of its scope, for the invention may admit to other equally effective embodiments.

DETAILED DESCRIPTION

Figure 1:
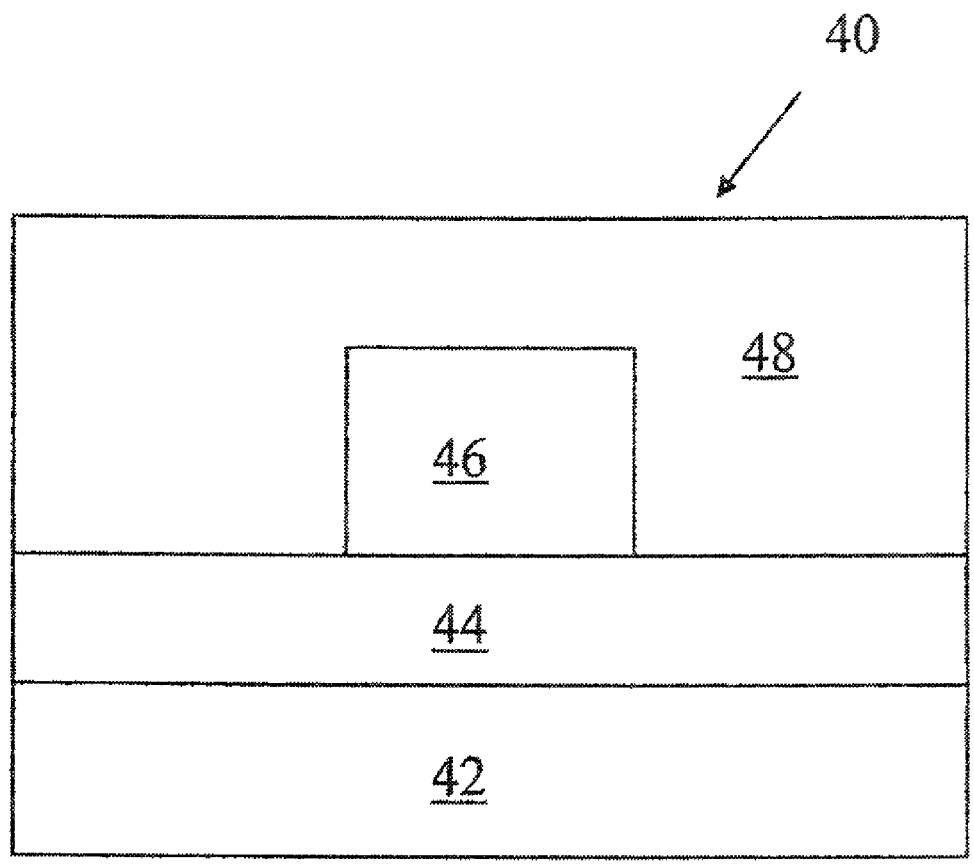
FIG. 1. Diagram of a ridge waveguide.

Presently preferred embodiments of the invention are shown in the above-identified figures and described in detail below. In describing the preferred embodiments, like or identical reference numerals are used to identify common or similar elements. That is, the reference numerals include similar numeric prefixes and different alphabetic suffixes to specifically identify particular elements in the drawings. The numeric prefix by itself refers to a group of elements and not to any particular element. The figures are not necessarily to scale and certain features and certain views of the figures may be shown exaggerated in scale or in schematic in the interest of clarity and conciseness.

Figure 5:
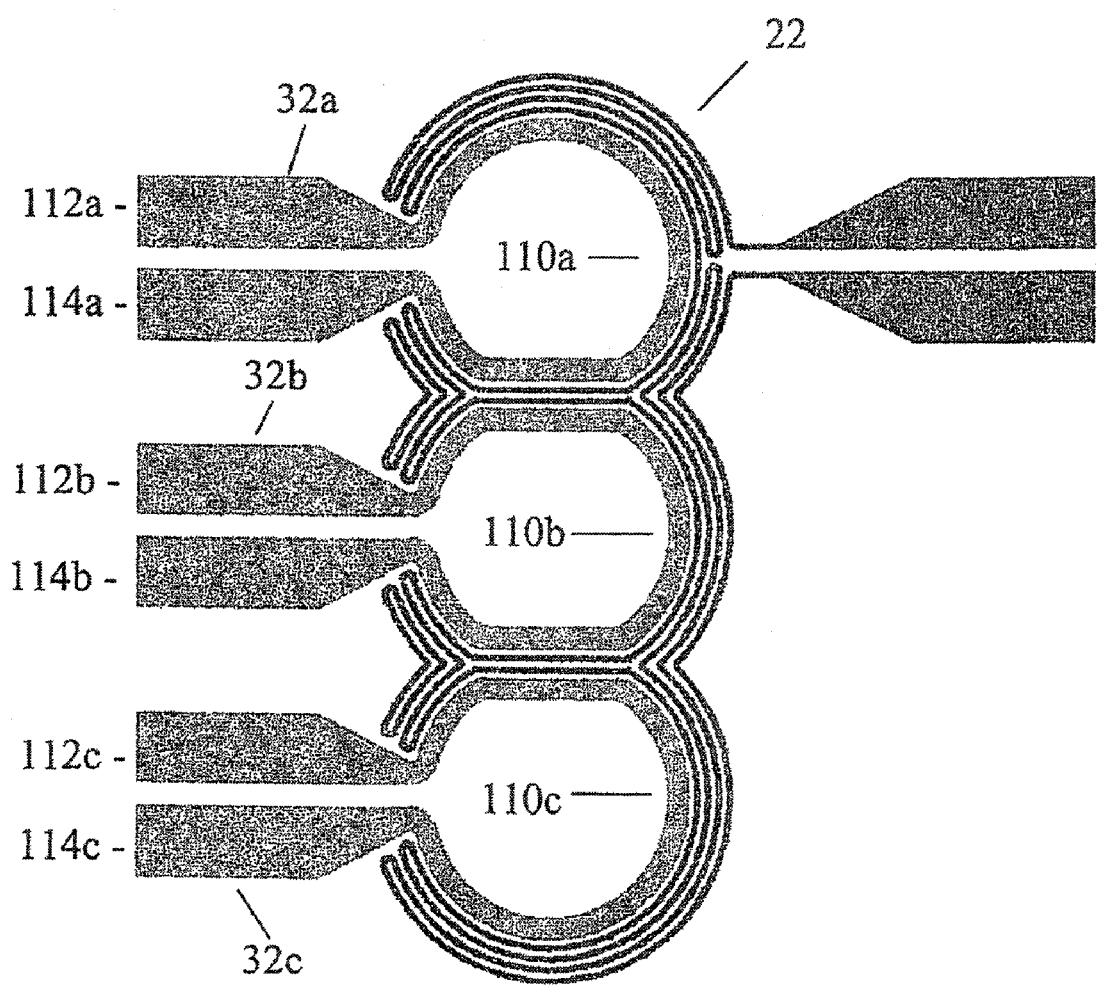
FIG. 5 Diagram of the metal pattern for the heaters and RTD associated with a compound optical resonator having three ring resonators.
Figure 6:
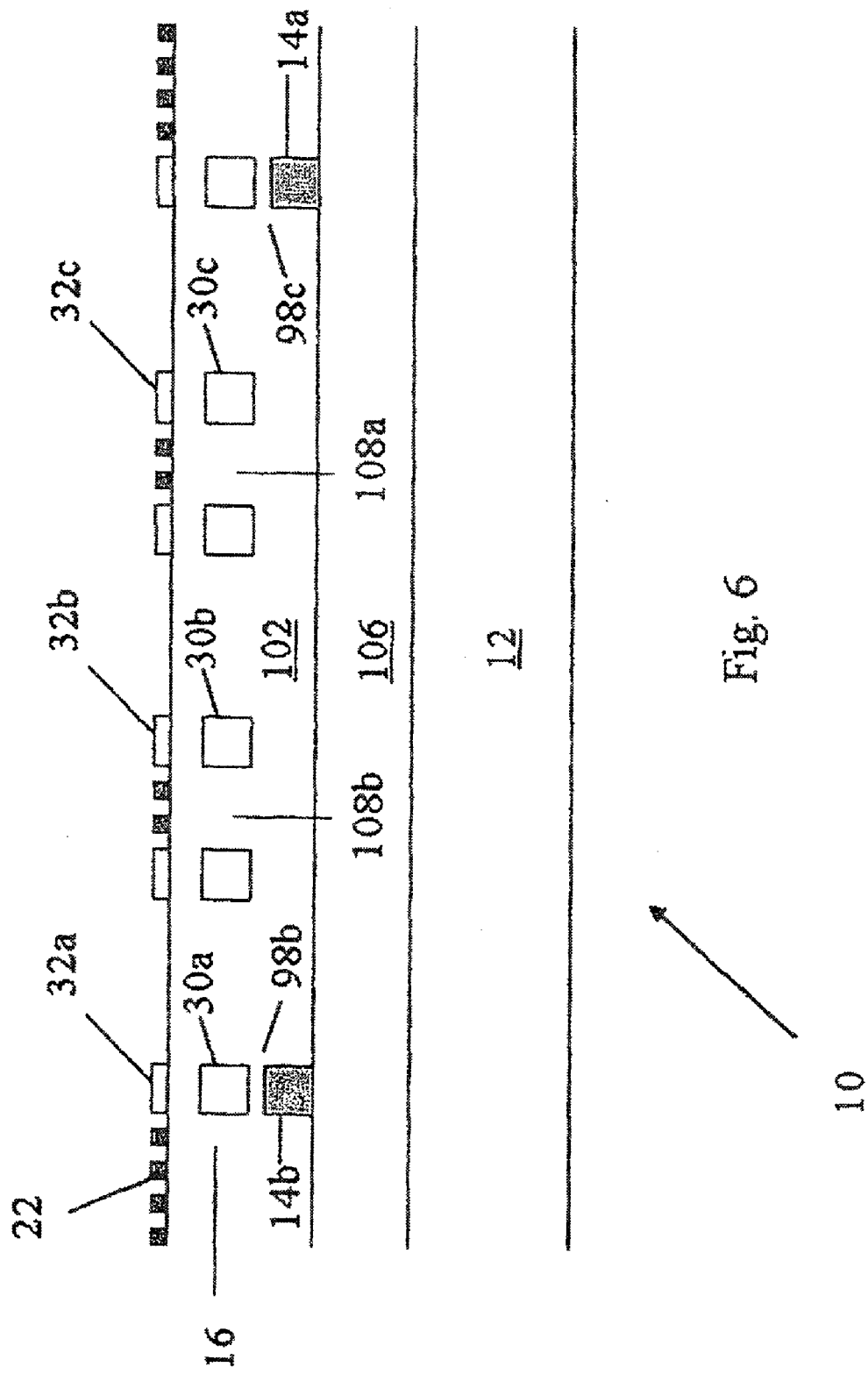
FIG. 6 Cross-sectional view depiction down the center line of the compound resonator structure of FIG. 5 showing heaters, RTD, optical and ring resonator waveguides.

Referring now to the drawings, and more particularly to FIGS. 5 and 6, shown therein is an integrated optical device 10 constructed in accordance with the present invention. The integrated optical device 10 is provided with a substrate 12, at least one optical waveguide 14 (two are shown and labeled with reference numerals 14a and 14b), at least one compound optical resonator 16 (comprising coupled optical resonators 30a, 30b, and 30c), first (32a and 32c) and second (32b) subsets of heaters, and one or more temperature sensor 22. The at least one optical waveguide 14a or 14b resides on the substrate 12. The at least one compound optical resonator 16 is optically coupled with the at least one waveguide 14a or 14b. The compound optical resonator 16 includes at least two coupled optical resonators shown and labeled with the reference numerals 30a, 30b, and 30c. Each of the heaters making up the first and second subsets are shown and labeled with reference numerals 32a, 32b, 32c where each is localized to at least one of the optical resonators 30a, 30b or 30c of the compound optical resonator 16. The temperature sensor 22 is localized to at least two of the coupled optical resonators 30a, 30b, and 30c of said compound optical resonator 16.

FIGS. 1-4 will now be described in more detail. As discussed above in the background section, FIGS. 1-4 illustrate prior art components or procedures which are utilized to construct portions of the integrated optical device 10. More particularly, FIG. 1 illustrates a cross-sectional view of an exemplary planar optical waveguide 40 known in the art as a ridge. The planar optical ridge waveguide 40 is formed on a substrate or wafer 42 by the formation of a lower optical cladding 44 on the substrate 42 and an optical core element 46 formed on the lower optical cladding 44 using any suitable technique, such as chemical vapor deposition, such that the optical core element 46 also resides on the substrate 42. The optical core element 46 is then shaped or patterned using, for example, lithographic patterning and etching of the optical core element 46. Then, the shaped optical core element 46 is surrounded with an upper optical cladding layer 48 (see e.g. U.S. patent application Ser. No. 10/864,511). The optical core element 46 forms an optical waveguide that is a fundamental building block for making optical resonators 60, compound optical resonators 16, and integrated optical devices 10. Planar optical waveguides 40 can be used to form a single optical device (e.g., an individual microresonator) or an optical system (e.g., a series or cascade of microresonators formed into a demultiplexer or tunable filter). The procedure discussed above for forming the planar optical waveguide 40 can be used for forming the optical resonators 60 and waveguide(s) 14 of the integrated optical device 10.

Turning again to FIG. 1, the substrate 42 is selected from any suitable material or wafer such as silicon. The substrate 42 may be constructed of other materials and may include electrical, optical, and optoelectronic devices and circuits. The substrate or wafer 42 may consist of a single material (e.g. a silicon wafer), a stack of several different materials (e.g. a layer of thermal oxide (SiO2) on silicon), or a preformed device or circuit. A preformed device or circuit may contain one or more electrical devices (e.g. transistors), optical devices (e.g. mode transformers), microelectromechanical systems (MEMS) devices (e.g. mirrors), and optoelectronic devices (e.g. detectors, amplifiers, modulators, light emitting diodes, and lasers).

Figure 2:
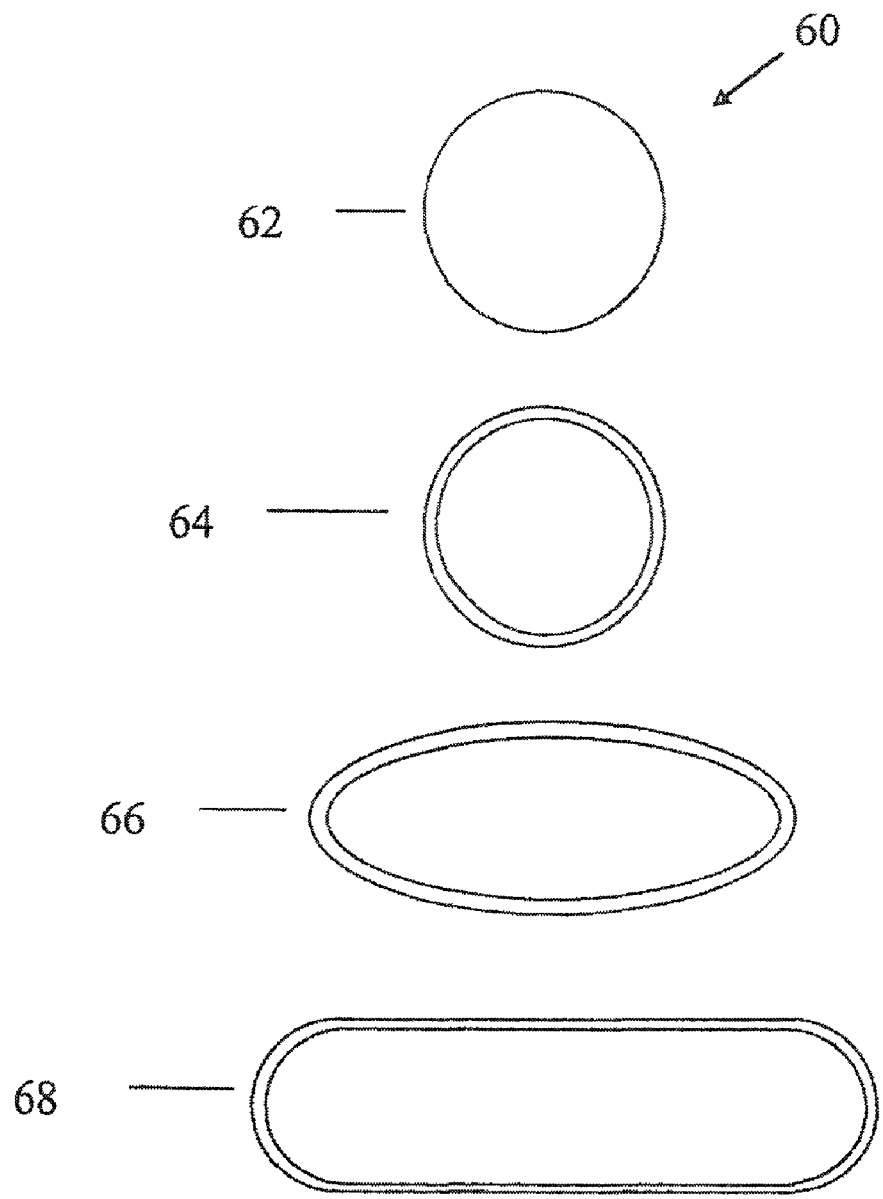
FIG. 2. Diagrams of disk, ring, elliptical, and racetrack optical resonator geometries.
Figure 3:
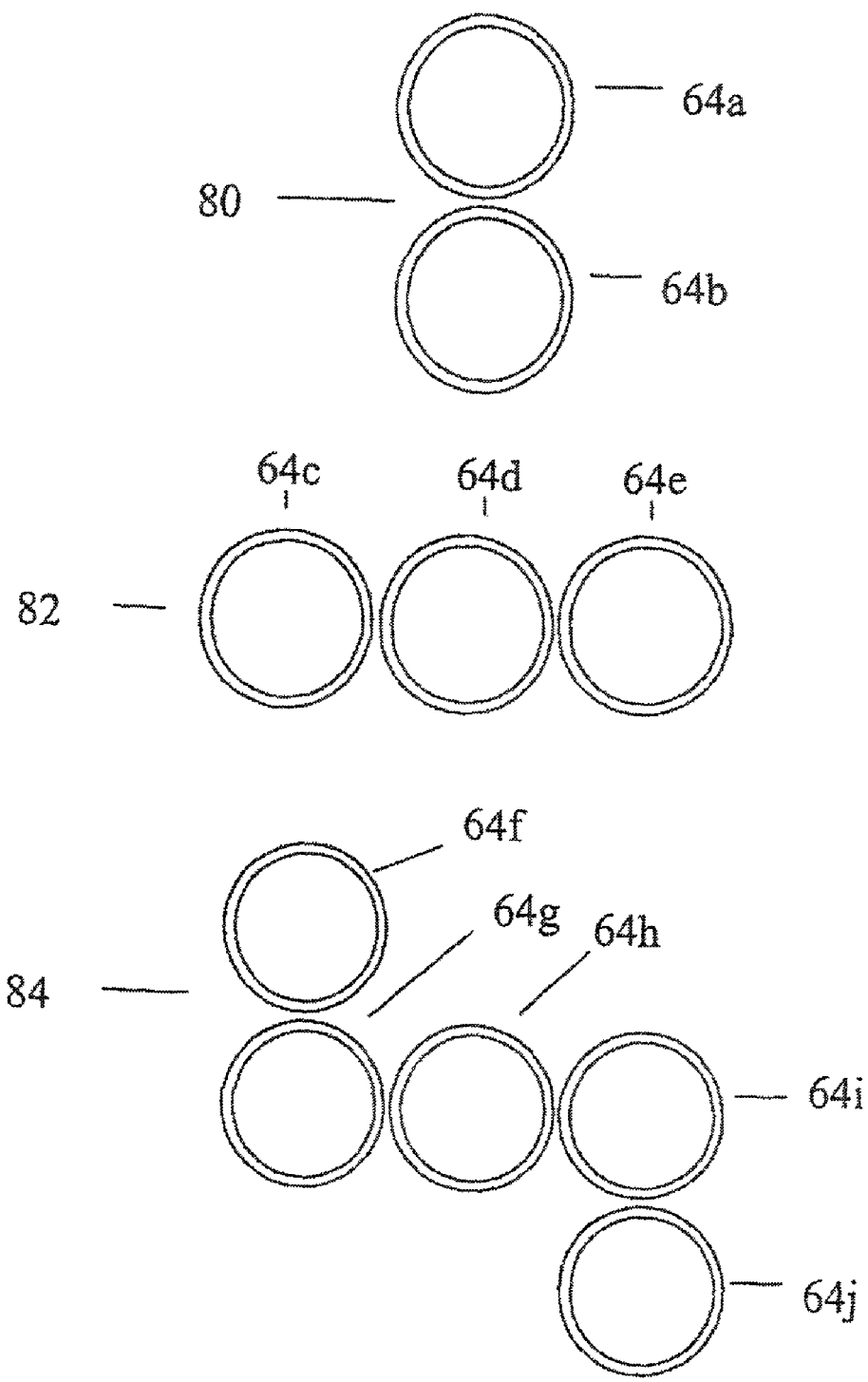
FIG. 3. Diagram of compound optical ring resonators having two, three, and five optically coupled rings.

The compound optical resonator 16 is formed from the combination of at least two optical resonators 30a, 30b, and 30c. FIG. 2 depicts several examples of optical resonator waveguides 60 having a disk 62, ring 64, ellipse 66, or racetrack 68 geometry. However, other closed loop geometries are feasible as well. The optical resonators 30a, 30b, and 30c making up the compound optical resonator 16 are configured such that the closest distance, or coupling gaps 108a and 108b, between the outer surfaces of one optical resonator 30a, 30b, or 30c and an adjacent optical resonator 30a, 30b, or 30c allows for optical coupling of a portion or all of the signal from one optical resonator 30a, 30b, or 30c to the adjacent optical resonator 30a, 30b, or 30c. FIG. 3 shows example configurations of the compound optical resonator 16 designated by the reference numerals 80, 82, and 84. The compound optical resonator 80 includes two of the optical resonators 64a and 64b. The compound optical resonator 82 includes three of the optical resonators 64c, 64d, and 64e. The compound optical resonator 84 includes five of the optical resonators 64f, 64g, 64h, 64i and 64j.

Figure 4:
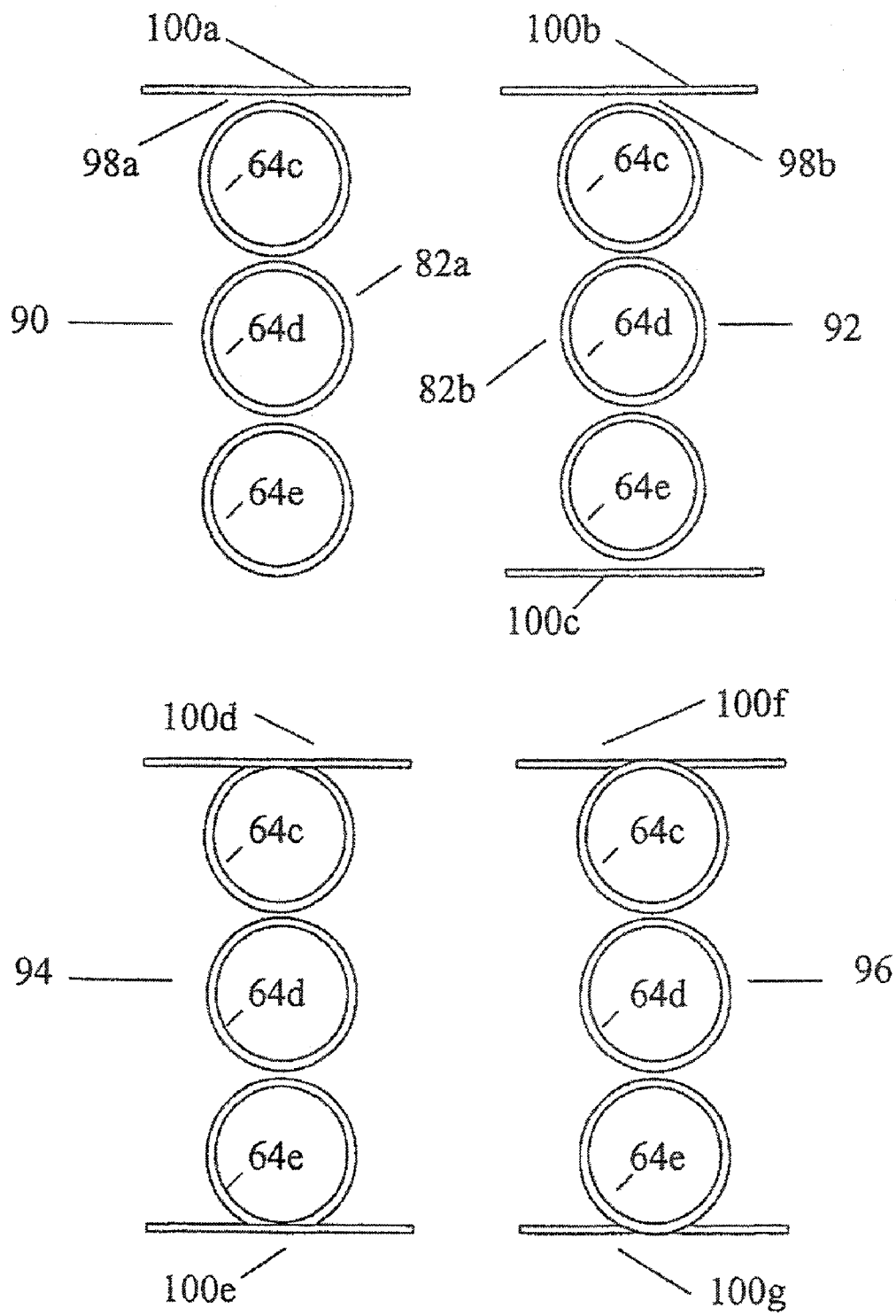
FIG. 4 Diagram of compound optical resonators optically coupled to one or two adjacent optical waveguides that reside beside, above, or below a ring resonator.

The combined unit of optical resonators 30a, 30b, and 30c forming the compound optical resonator 16 of the integrated optical device 10 must also be optically coupled to at least one of the optical waveguide(s) 14a or 14b bearing an optical signal. FIG. 4 shows example configurations (identified by reference numerals 90, 92, 94 and 96) of the compound optical resonator 16 optically coupled to various configurations of optical waveguide(s) 14 via one or more coupling gapes) 98. In particular, the example configuration identified by reference numeral 90 includes a single, laterally adjacent optical waveguide 100a optically coupled with the compound optical resonator 82a via a coupling gap 98a. In this configuration, the input optical signal enters and the output optical signal exits the compound optical resonator 82a via the same optical waveguide 100a. This type of configuration is sometimes known as an all-pass filter and can be used, for example, to modulate the phase of an optical signal such as in a dispersion compensator. A more conventional design that is used for applications such as add/drop multiplexing and tunable filtering is designated by the reference numeral 92 in FIG. 4. Here, two optical waveguides 100b and 100c (e.g., referred to below as upper and lower waveguides) are positioned near the compound optical resonator 82b laterally adjacent to the two outer optical resonators 64c and 64e of the three-optical resonator compound optical resonator 82b. In this case, an optical signal traversing the upper waveguide 100b that is resonant with one of the optical modes of the compound optical resonator 82b will traverse the resonator cavity and exit via the lower waveguide. The arrangements identified by the reference numerals 94 and 96 are similar to the arrangement identified by the reference numeral 92 except that in the arrangement 94 the waveguides 100d and 100e are positioned above the optical resonators 64, and in the arrangement 96 the waveguides 100f and 100g are positioned below the optical resonators 64. The integrated optical device 10 can utilize any combination of optical resonators, (e.g., 62, 64, 66 and 68 depicted in FIG. 2), number of optical resonators (e.g. 80, 82, and 84 depicted in FIG. 3), and arrangement of one or more waveguides (e.g. 90, 92, 94, and 96 depicted in FIG. 4).

As shown in FIG. 5, the integrated optical device 10 of the present invention has individual heaters 32a, 32b, and 32c localized to each optical resonator 30a, 30b, and 30c in the compound resonator 16. The heaters are labeled in FIG. 5 with the reference numerals 32a, 32b and 32c for purposes of clarity. Each of the heaters 32a, 32b, and 32c include a heater element 110a, 110b, and 110c and a pair of leads 112a, 112b, 112c, 114a, 114b, and 114c for supplying power to the heater elements 110a, 110b, and 110c. To minimize both power consumption and the intrinsic thermal time constant of compound resonator elements 16 within a thermo-optic device, it is preferred to limit the volume of heated material to the core element region of the optical resonators 30a, 30b, and 30c. Thus, it is preferred that the heater elements 110a, 110b, and 110c be substantially conformal with and localized to the optical resonator waveguides. In general, the heater elements 110a, 110b, and 110c will have a length that follows the path of the optical resonator waveguide and a width that is desirably between one to ten times the width of the optical resonator waveguide 30a, 30b, and 30c core elements. The heaters are individual in that the power dissipation of each heater 32a, 32b, and 32c may be set independently of the other heaters in the integrated optical device 10. This requires that at least one lead 112a, 112b, 112c, and 114a, 114b, and 114c of the heater be independent, while the second lead 112a, 112b, and 112c, may be independent or electrically connected with other leads 112a, 112b, 112c, 114a, 114b, and 114c to a common voltage or ground.

As discussed above, the integrated optical device 10 of the present invention provides the temperature sensor 22 localized to at least two of the optical resonators 30a, 30b, and 30c and preferably all of the optical resonators 30a, 30b, and 30c. It is preferred to utilize only one temperature sensor 22 as the feedback element for each compound resonator 16. The temperature sensor 22 may be a resistive temperature device (RTD) such as a metal film resistor, a thermistor, thermocouple, or temperature sensing diode. For an example case of an RTD or thermistor, it is preferred that the trace path of the film lie in close proximity to the optical core element but not so close as to induce optical loss. As an example, an RTD may lie in a plane near the optical core waveguide elements or trace a path adjacent to the set of individual heaters 32a, 32b, and 32c. In either case, the measured temperature sensor value will be a resistance substantially representative of the average temperature along its path. For RTDs, it is desirable to choose a metal film deposition thickness, trace width, and length to achieve a resistance value between about 100 and 10000 ohms. Thermocouples and temperature sensing diodes can be localized more to a point location near to each optical resonator 30a, 30b, and 30c.

As an example, FIG. 5 shows the individual heaters 32a, 32b, and 32c and temperature sensor 22 combination of a three-ring compound optical resonator 82 having ring radii of about 45 microns. The heaters can be formed via any suitable process. For example, in one preferred embodiment, a 0.2 micron thick platinum metal film is deposited using electron-beam thermal deposition. The metal is deposited over a photo-lithographically patterned layer of photoresist having open windows substantially over the optical resonator waveguides as depicted. After a lift-off procedure, platinum remains in the open window areas. With an example width of 8 microns, the heater resistance is approximately 25 ohms. Generally, however, heater resistances of between 10 and 500 ohms are acceptable. In this example, the heater trace leads 112a, 112b, 112c, 114a, 114b, and 114c broaden and connect to gold strip lines (not shown) leading to a bond pad. From the bond pad, the trace can be connected through a wire bond, or other packaging technique, to a chip package and ultimately a printed circuit board.

FIG. 5 also shows the path traced by a single platinum RTD temperature sensing element 22. In this example, the temperature sensing element 22 is coplanar with the heaters 32a, 32b, and 32c and located near and adjacent. The platinum metal film is formed in a similar manner to the platinum heater discussed above. The deposition thickness is about 0.2 microns, and the trace width and spacing are 2 microns such that the resistance is about 800 ohms at 300 K. The technology of platinum resistance thermometry is well known in the field.

FIG. 6 contains a cross-sectional view down the center line of the example compound resonator structure of FIG. 5. The layout of the heaters 32a, 32b, and 32c and RTD 22 trace cross-sections are shown in the top layer. These metal traces may be air clad or encapsulated in a protective overcladding material such as $SiO_2$. Just below is an $SiO_2$ optical cladding layer 102 (see ego U.S. Pat. No. 6,768,828) in which the Microring resonator waveguides 30 and optical waveguides 14 lie. In this example, the lateral and vertical waveguide dimensions are about 1.5 microns, the waveguide to resonator coupling gaps 98 are about 0.3 microns, and the resonator to resonator coupling gaps 108 are about 0.6 microns. Coupling gaps 98 and 108 are design dependent, but separations generally lie between about 0.2 to 2 microns. Lastly, a lower cladding material layer 106 composed of about 15 microns of silicon thermal oxide is shown over a silicon substrate 12.

The compound resonator 16 acts on an optical input signal through a transfer function to affect the optical properties of the output signal such as center wavelength, amplitude, phase, and shape. For an optical filter type device, the properties of interest are generally passband shape and center wavelength. These properties of the output signal are optimized through a calibration process. The calibration process comprises the steps of measuring the optical signal properties of interest and adjusting the local temperatures of each of the optical resonators 30a, 30b, and 30c to obtain optimum optical property values. The local temperature of each optical resonator 30a, 30b, and 30c is adjusted by changing the power dissipation in the associated resonator heater 32a, 32b, and 32c. The result is the generation of a calibration data point for each set of desired optical properties of the output signal. This calibration data point is characterized by the measured value of the compound optical resonator temperature sensor 22 and the power dissipation in each of the optical resonator heaters 32.

Figure 7:
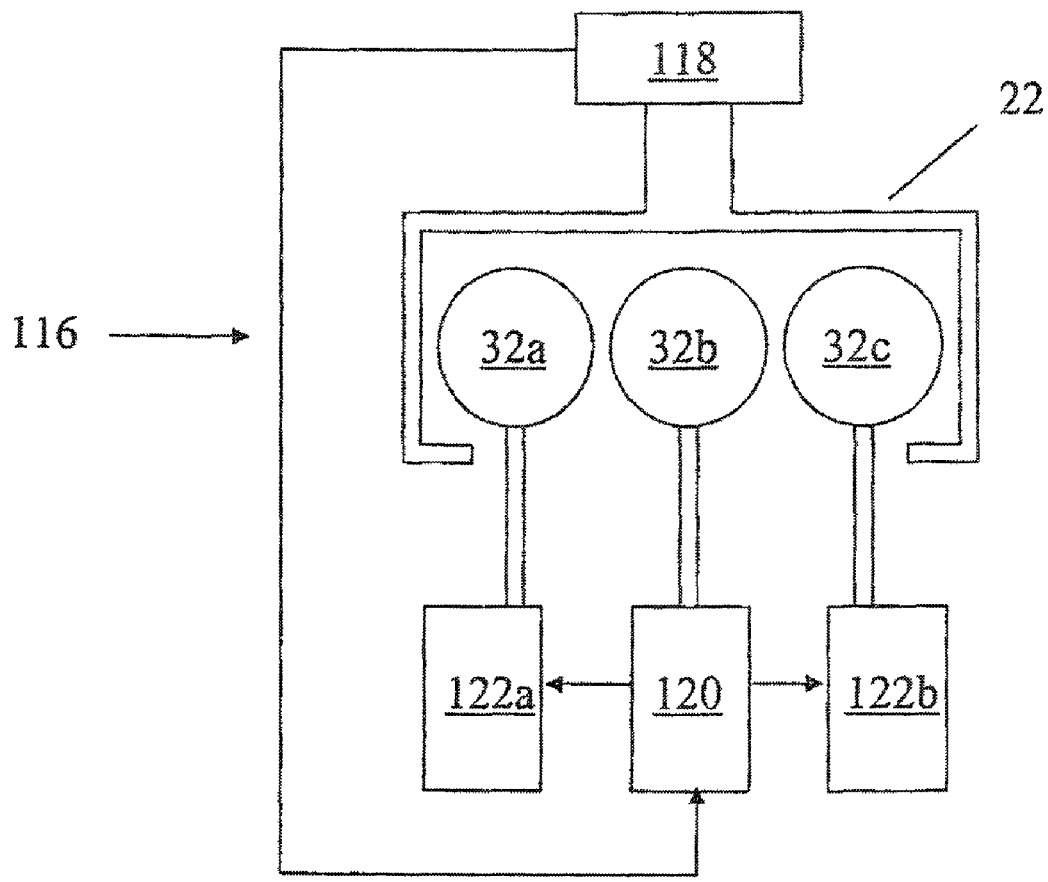
FIG. 7 Block diagram layout of an example circuit controlling a 3-ring compound optical resonator.

FIG. 7 shows a block diagram example of a control system 116 for regulating a 3-ring compound optical resonator 82. The individual heaters 32a, 32b, and 32c localized to each optical resonator 30a, 30b, and 30c are denoted by 32a, 32b, and 32c, and the temperature sensor localized to the compound resonator cavity is labeled 22. The output of the measurement circuit 118 that is monitoring the value of the temperature sensor 22 is connected to a heater controller 120. The combination of sensor and controller make a feedback circuit. The controller 120 adjusts or regulates the power dissipation in one of the heaters 32 (in this case, the center ring heater 32b) to maintain or move the temperature sensor reading towards a desired set point that may, for example, correspond to a specific resonant wavelength. This relationship between sensor reading and filter wavelength would have been determined during an earlier calibration or optical measurement process.

The power dissipated in the remaining resonator heaters 32 is regulated by controllers 122 having as their input the value of the power dissipation output of controller 120. These other two heaters 32a and 32c are slaved to the dissipation power of the heater 32b under direct control of the feedback loop. The power dissipation for these resonator heaters 32 is calculated and set according to a predetermined function based and derived from the calibration data points. The function input variable is the power dissipated in the heater 32b under control of the feedback loop.

The invention is not limited to the example of a 3-ring compound resonator 82 and may comprise N coupled optical resonators. As an example, one resonator heater 32b would be under control of the feedback loop whereas the other (N−1) heaters 32a or 32c would be slaved to the power dissipation in the one resonator heater 32b according to any number of functional relationships, from 1 to (N−1) distinct functions. It is also worth noting here that an additional and more global control system feedback loop may be added to the overall integrated optical device 10. Since the localized temperature sensor 22 is not directly contacting the waveguide material but rather spaced a small distance away, there is a possibility for small temperature offsets or errors due to global temperature changes in the environment or substrate 12. For devices requiring very precise temperature control of less than 1 degree Celsius, it is preferred that the substrate or wafer 12 temperature be regulated as well. This may be done with a control system comprising a thermoelectric cooler (TEC) or heater in thermal contact with the substrate 12, an associated controller or driver circuit, and a temperature sensor 22 not localized to any specific thermo-optic device but rather in thermal contact with the substrate itself.

Figure 8:
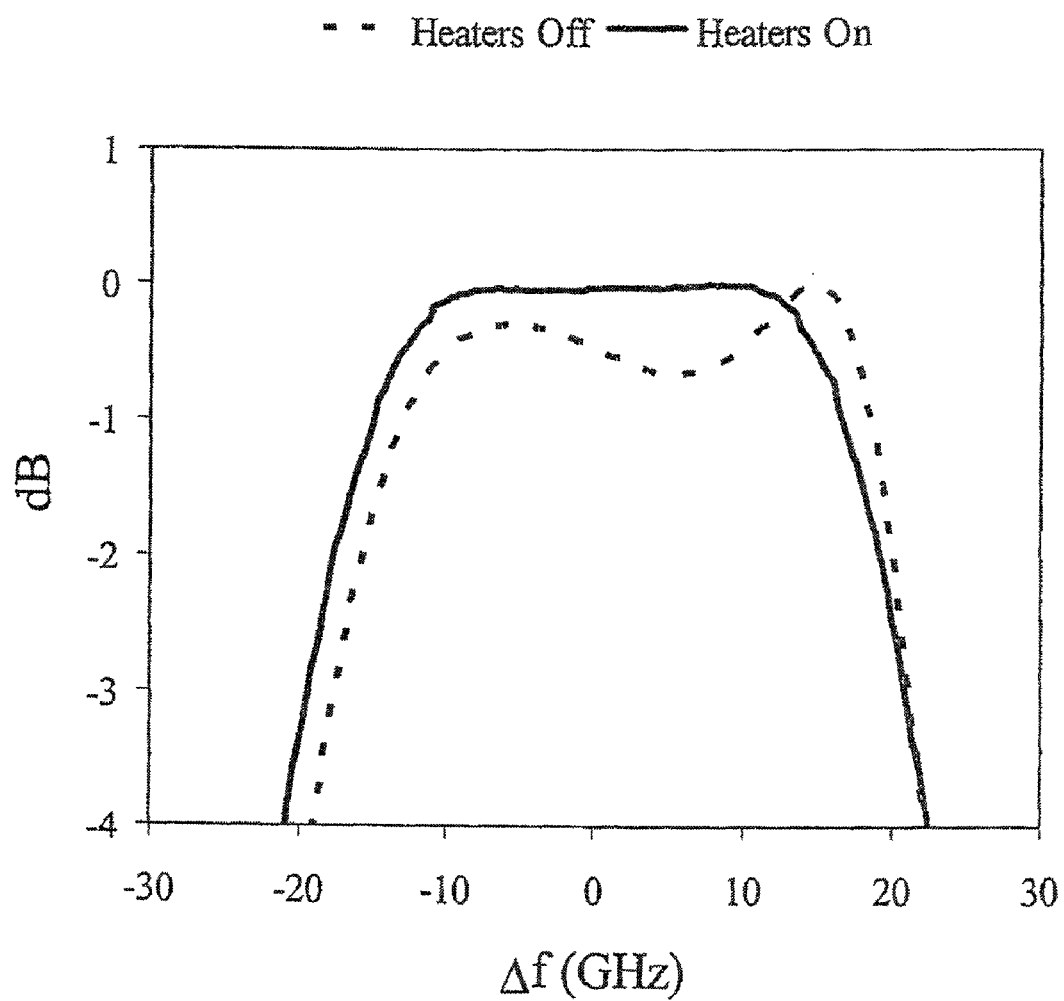
FIG. 8 Data showing the optical transfer function response for an optical signal traversing a 3-ring compound optical resonator with the heaters-off and with the heaters on, where the heaters-on power dissipation is optimized to achieve a flat response.
Figure 9:
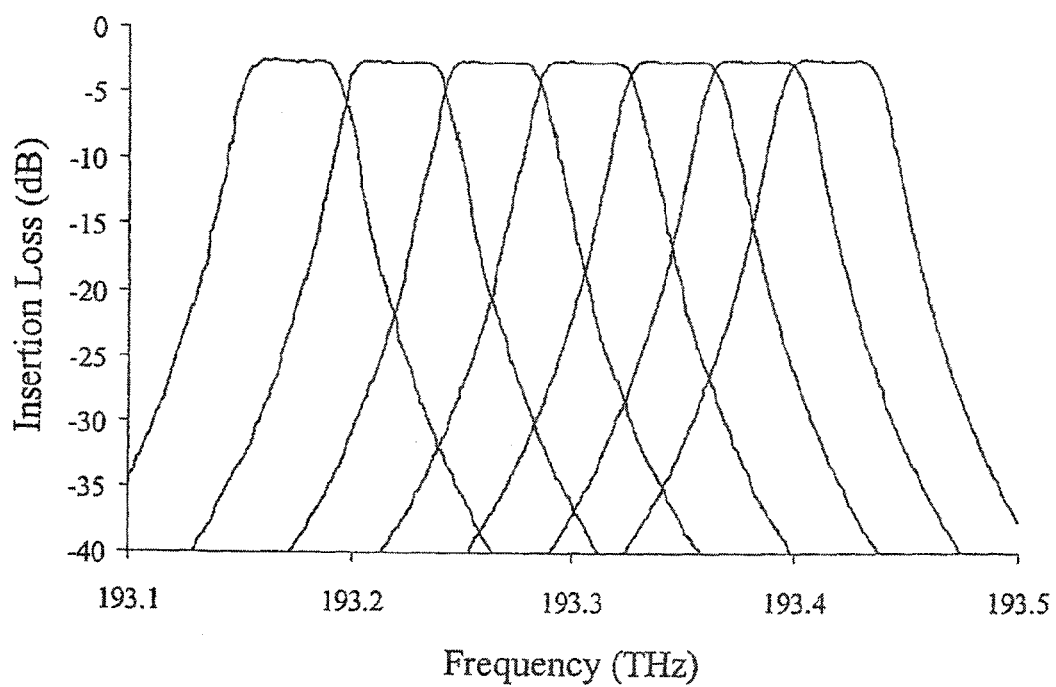
FIG. 9 Data showing the optical transfer function response for an optical signal traversing a 3-ring compound optical resonator for seven different optimized heater power dissipation settings.

FIG. 8 shows an example output signal from a 3-ring compound optical resonator 82. The compound optical resonator 82 is acting as a tunable filter element that is passing a band of optical frequencies. The filter passband data is plotted as a normalized optical intensity versus frequency, with the center frequency set to zero. The dashed line shows the filter shape with zero power dissipation in all the optical resonator heaters 32. The filter shape deviates from an ideal flat passband due either to a variation in refractive index or a detuning of the optical resonator ring radii from the optimal design value. A calibration process can be used to adjust the power dissipation in each heater 32a, 32b, and 32c to achieve the desired filter shape, which in this case is a flat passband, and the resulting data is shown by the solid line. FIG. 9 shows a set of optimized filter shapes from the 3-ring compound resonator element 82. Each passband corresponds to a different temperature sensor set point that is being used to regulate the power dissipation of the middle optical ring resonator heater 32b. The outer two optical resonator heater (32a and 32c) power dissipations are set by a function determined by the calibration process.

Figure 10:
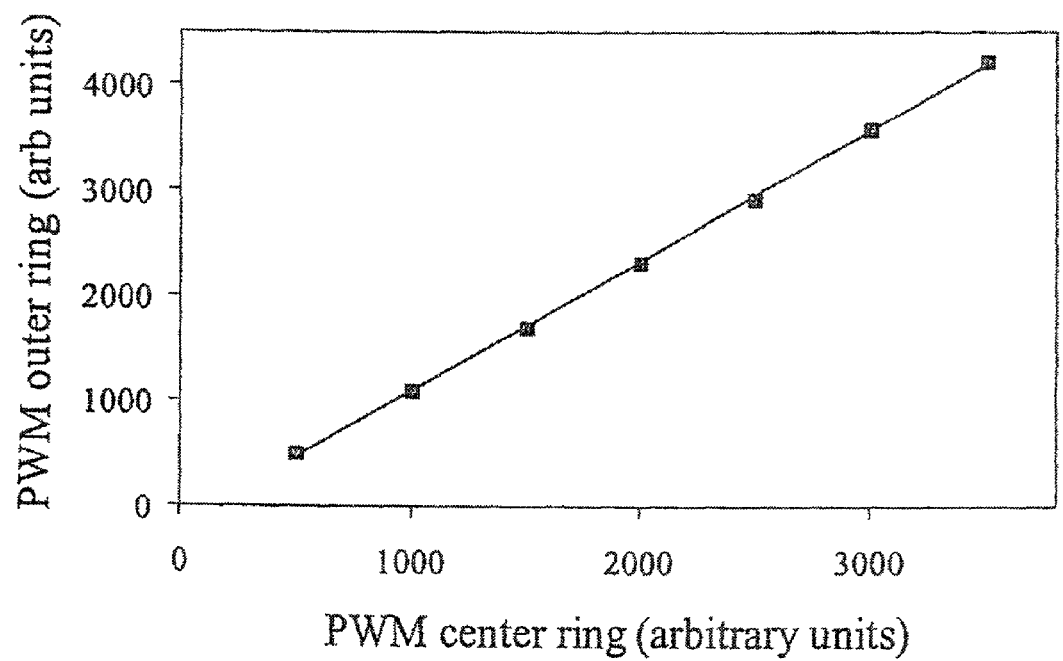
FIG. 10 Example data showing functional relationship between the optimum power dissipation in an outer ring of a 3-ring compound resonator versus the power dissipation in the center ring, which is under control of the feedback loop.

FIG. 10 shows an example set of calibration data for one of the outer two rings in relation to the power dissipation of the center ring, which is under control of the feedback loop. The pulse width modulation (PWM) duty cycles for the controllers 120 and 122a of each heater is plotted in arbitrary units and corresponds to power dissipation. In this case, the power dissipations in the outer ring heaters 32a and 32c was optimized during a calibration process for seven center ring power dissipation values. Using this data, a functional relationship can be generated that will determine an outer ring heater power dissipation value for any center ring power dissipation value that is regulated by the feedback loop. The relationship may be a simple linear relationship as shown, a second or third order polynomial, or any other functional form that fits the data set well.

In use, the compound resonator 16 acts on an input signal through a transfer function to manipulate the optical properties of the output signal such as center wavelength, amplitude, phase, and shape. The output optical signal properties of a compound optical resonator 16 are optimized through a calibration process comprising the steps of: measuring the optical signal properties of interest and adjusting the local temperatures of each of the optical resonators 30a 30b, and 30c to obtain optimum values. The local temperature of each optical resonator 30a, 30b, and 30c is adjusted by changing the power dissipation in the associated resonator heater 32a, 32b, and 32c. A calibration data point is generated for each set of desired optical properties for the output signal from the compound optical resonator 16. This calibration data point is characterized by the measured value of the compound optical resonator temperature sensor 22 and the power dissipation in each of the optical resonators 30a, 30b, and 30c.

The desired optical properties are maintained or reproduced at a later time using a feedback loop. The feedback loop is used by the control system 116 to directly control or adjust the power dissipated in at least one of the localized heaters 32a, 32b, or 32c. The output of the feedback loop is based on a loop input value that is the measured value of the temperature sensor 22 localized to the compound optical resonator 16, and the power is adjusted in order to achieve the desired temperature sensor value. The power dissipated in the remaining resonator heaters 32 is slaved to the dissipation power of the heater or heaters 32 under direct control by the feedback loop. The power dissipation in the remaining resonator heaters 32 is calculated and set according to a predetermined function based and derived from the calibration data points. The functional input variable is the power dissipated in the resonant heater 32 under control of the feedback loop.

In one preferred embodiment, the present invention overcomes the limitations of existing and proposed thermal control systems for compound optical resonators. By utilizing only one temperature sensor 22 per compound optical resonator 16, the number of feedback loops in operation for a given integrated optical device 10 are reduced. Whereas the integrated optical device 10 having four compound optical resonators 16, each containing five ring resonators 84, heaters 32, and temperature sensors 22 requires twenty active feedback loops for operation, the present invention reduces the required number to five. The result is a large reduction in the number of electrical leads on the optical chip as well as a corresponding reduction in the complexity of the electronics hardware and software driving the integrated optical device.

For example, electronic designs often rely on intermittent measurement of process variables in order to temporally multiplex or reuse a portion of an electrical circuit. Typically, a process input variable, such as an RTD value, of a feedback loop is measured and an adjustment is made to the output variable, which is power dissipation in this case. This particular feedback loop is then left alone while other process variables are measured and adjustments are made. The electronic circuit periodically returns to the original feedback loop to measure and adjust. By reducing the number of feedback loops in operation, a given electronic circuit design can measure and adjust more often.

A second significant advantage of having only one feedback loop for each compound optical resonator 16 is improved stability. Compound optical resonators having multiple feedback loops are effected by thermal crosstalk between the temperature sensor 22 of one resonator 30 and the heaters 32 of adjacent resonators 30. For example, as one heater control loop adjusts power upwards in response to a measurement from its feedback temperature sensor 22, the feedback temperature sensors 22 of a neighboring resonator 30 will record a portion of the temporary temperature rise. In this manner, independent control loops having large thermal crosstalk can oscillate around a set point or simply become unstable or noisy. It becomes exceedingly difficult to tune the resonator control systems for higher order compound resonators containing three or more rings. Extensive damping could be added to the control system 116 to mitigate some of the effects of thermal crosstalk, however, there is a penalty in terms of the speed of response of the control loop to changes in setpoint.

One more advantage of the integrated optical device 10 of the present invention is the ability to modify the transfer function of the compound optical resonator 16 by applying different temperatures to the different optical resonators 30 making up the compound resonator 16. Often in the manufacturing process of fabricating integrated optical devices, there are slight variations in refractive index or waveguide dimensions for the different optical resonators. For example, a tunable optical filter constructed from compound resonators having three rings resonators will have an optimum flat-top passband only if the resonant wavelengths of all three rings are similar. In fact, for an optical filter having a ring resonator design 64 with a radius of curvature of about 50 microns, a deviation in radius between two rings of only one or two nanometers detunes the resonant wavelengths by enough to degrade the filter shape. The result is a very tight requirement on the manufacturing process. The integrated optical device 10 allows detunings of the various optical resonators 30 making up a compound resonator 16 to be corrected by adjusting the local temperature. A ring 64 having a slightly lower resonant wavelength than desired can be heated to match the resonances of the other rings 64 in the compound resonator 16. The additional heating requirement can simply be incorporated into the predetermined function during the calibration process that determines the power dissipation of that ring 64.

It will be understood from the foregoing description that various modifications and changes may be made in the preferred and alternative embodiments of the present invention without departing from its true spirit.

This description is intended for purposes of illustration only and should not be construed in a limiting sense. The scope of this invention should be determined only by the language of the claims that follow. The term "comprising" within the claims is intended to mean "including at least" such that the recited listing of elements in a claim are an open group. "A," "an" and other singular terms are intended to include the plural forms thereof unless specifically excluded

We claim:

1. A method comprising the steps of:
   providing a substrate;
   forming a first and a second optical resonator on the substrate, the first optical resonator optically coupled to the second optical resonator;
   forming first and second heaters on the substrate, the first heat being configured to adjust a temperature of the first resonator and the second heater being configured to adjust a temperature of the second resonator;
   forming a temperature sensor on the substrate, the temperature sensor being configured to sense the temperature of the first resonator and the temperature of the second resonator;
   actively controlling a power dissipated in the first heater to maintain an output of the temperature sensor at a value; and
   adjusting the power dissipated in the second heater as a function of the power dissipated in the first heater.

2. The method of claim 1, wherein the power dissipated in the second heater is a linear function of the power dissipated in the first heater.

3. The method of claim 1, wherein the power dissipated in the second heater is a polynomial function of the power dissipated in the first heater.

4. The method of claim 1, wherein the power dissipated in the second heater is a second order polynomial function of the power dissipated in the first heater.

5. The method of claim 1, wherein power is supplied to the first and second heaters using pulse width modulation.

6. The method of claim 1, wherein the second heater is one of a plurality of second heaters.

7. The method of claim 6, wherein the first heater is one of a plurality of first heaters.

* * * * *